W. G. LAIRD.
CALORIMETER.
APPLICATION FILED JUNE 24, 1919.
1,381,714.
Patented June 14, 1921.
2 SHEETS—SHEET 1.
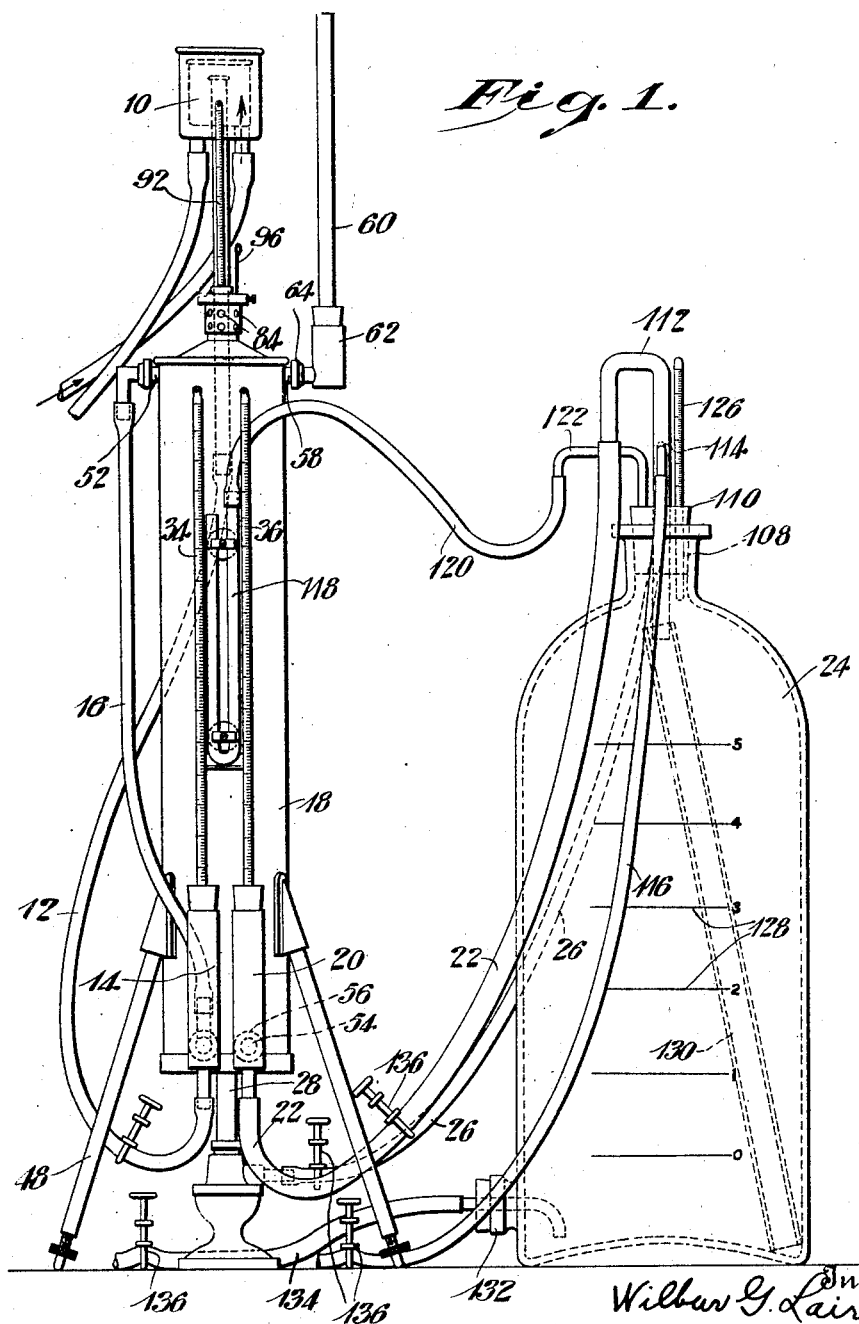

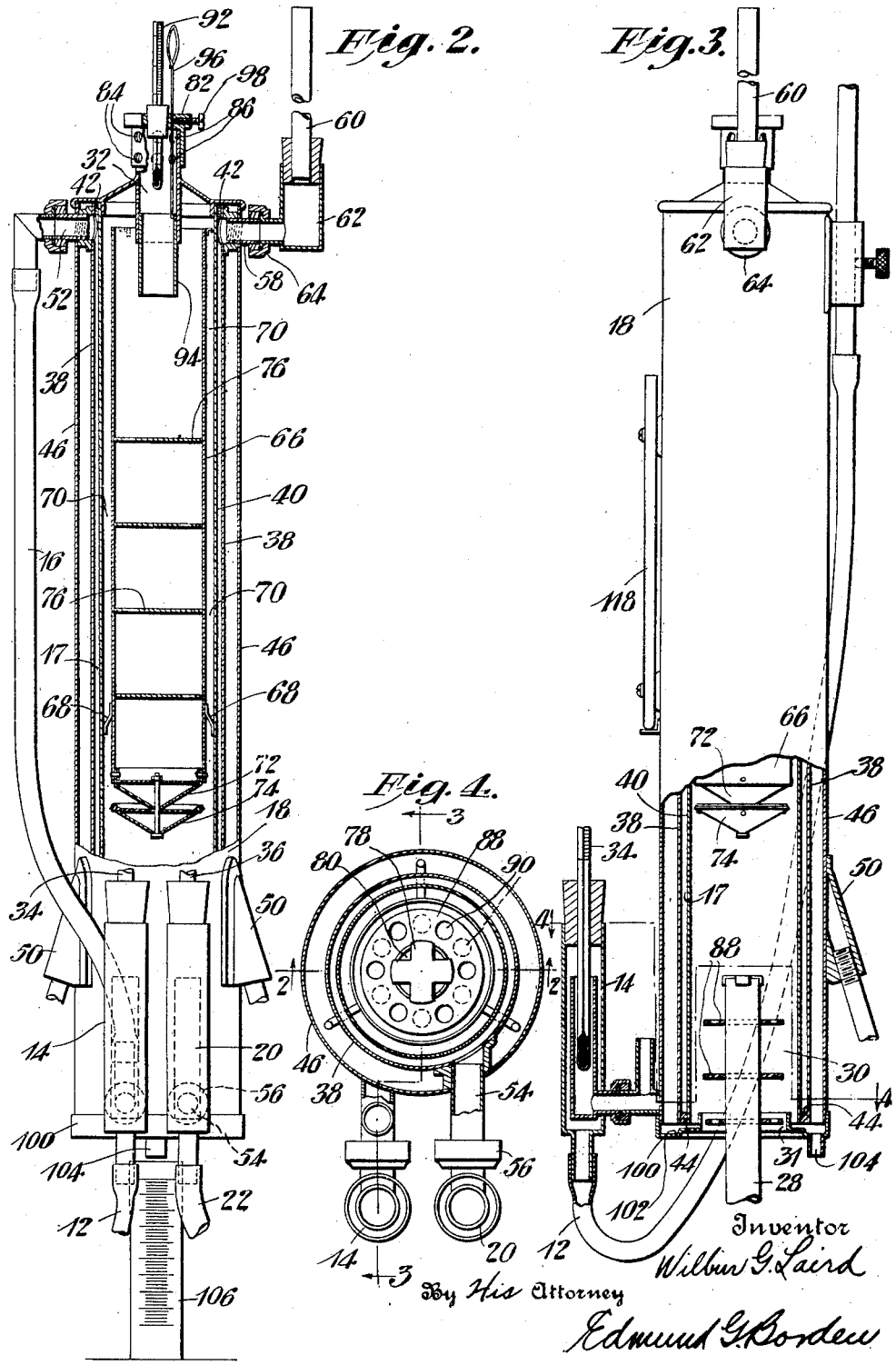

UNITED STATES PATENT OFFICE.

WILBUR G. LAIRD, OF NEW YORK, N. Y., ASSIGNOR TO HENRY L. DOHERTY, OF NEW YORK, N. Y.

CALORIMETER.

1,381,714.   Specification of Letters Patent.   Patented June 14, 1921.

Application filed June 24, 1919. Serial No. 306,392.

*To all whom it may concern:*

Be it known that I, WILBUR G. LAIRD, a citizen of the United States, residing at New York city, in the county of New York, State of New York, have invented certain new and useful Improvements in Calorimeters; and I do hereby declare the following to be a full, clear, and exact description of the invention, such as will enable others skilled in the art to which it appertains to make and use the same.

This invention relates to calorimeters and more particularly to calorimeters for measuring the calorific values of combustible gases.

The usual method of measuring the calorific value of a gas consists in burning a measured quantity of gas, absorbing the heat of combustion of the gas in a measured quantity of water and measuring the rise in temperature of the water due to the heat absorption. Most of the different kinds of gas calorimeters at present in use employ an absorption chamber which consists of a combustion chamber and gas flues surrounded by a body of water in which the heat generated by burning gas is absorbed. These absorption chambers, while satisfactory in many respects, have inherent defects of mechanical construction which produce errors in making heat measurements and limit accurate measurements to a narrow range of conditions. For example, it is necessary to burn a large volume of gas and heat a large quantity of water when making a heat determination in order to minimize the measurement errors. Further, since it is necessary to have a substantially complete heat absorption, the heat absorption chamber must have a large cooling surface and contain a large volume of cooling water. In order to obtain a large cooling surface without making the size of the absorption chamber excessive, the water chamber must be made in a number of small connected compartments, permitting inequalities in the rate of flow of the water in the different compartments and the formation of dead spaces where the water is nearly stationary. An absorption chamber which will meet these conditions must be constructed of a large body of metal that will necessarily have a high thermal capacity. The high thermal capacity of the absorption chamber causes a substantial lag in the thermometer readings and a large volume of water in the absorption chamber means that a long period of time elapses between the time when the water passes the inlet thermometer and when the same water passes the outlet thermometer. With such a construction also substantial changes in the temperature of the water entering the absorption chamber and substantial changes in the calorific power of the gas are not accurately and quickly indicated in the calorific measurements. In fact, most of the calorimeters in use are so operated that temperature measurements of the same unit of water cannot be made at the inlet and outlet of the absorption chamber during a single heat determination.

An object of the present invention is to provide an absorption chamber for a gas calorimeter which is simple and inexpensive to construct, which is efficient and accurate in operation and which will overcome the objectionable features above referred to.

With these and other objects in view the invention consists in the improvement in gas calorimeters hereinafter described and particularly defined in the claims.

The various features of the invention are illustrated in the accompanying drawings in which—

Figure 1 is a view in front elevation of a gas calorimeter embodying the preferred form of the invention.

Fig. 2 is a view in front elevation and partly in section of the heat absorption chamber on the line 2—2 of Fig. 4.

Fig. 3 is a view in side elevation partly in section of the heat absorption chamber taken on line 3—3 of Fig. 4, and Fig. 4 is a horizontal sectional view of the heat absorption chamber taken on the line 4—4 of Fig. 3.

The method used in the present invention for determining the calorific value of combustible gases is substantially the same as that illustrated and described in the patent to Henry L. Doherty, #826,306, granted August 14th, 1906. The basis of this method consists in burning gas with air in an absorption chamber while displacing the gas being burned volume for volume with water being heated in the absorption chamber. With this constant relation between the gas burned and the volume of water heated it is only necessary to make a measurement of the different temperatures of the water at the inlet and outlet of the absorption chamber. This temperature difference when multiplied by the coefficient of thermal capacity of a unit quantity of water will give the calorific value of the gas. This value must be corrected to the usual standard conditions of pressure and temperature.

To make a heat determination with the calorimeter illustrated in the drawing, water to be used for the determination, is led from a pressure regulator 10, successively through a flexible tube 12, a thermometer well 14 and a tube 16 to the upper end of a water compartment 17 of a heat absorber 18 (Figs. 2, 3 and 4). In the water compartment 17 the water is brought into a heat conducting relation to the products of combustion of the gas to be tested and is raised in temperature to a greater or less degree according to the calorific value of the gas. After being heated in the heat absorber, the water leaves the compartment 17 through a thermometer well 20 and flows through a flexible tube 22 to a gas tank 24, which contains gas to be tested. The gas contained in tank 24 is displaced by the entering water and passes through a tube 26 to a burner 28 which extends into a combustion chamber 30 surrounded by the water compartment 17 of the heat absorber 18. Air for supporting combustion of the gas in the burner 28 enters the lower part of the combustion chamber of the absorber 18 through an opening 31, and passing upwardly through the combustion chamber, gives up its heat to the downwardly flowing stream of water. The products of combustion deprived of their heat, leave the heat exchanger through an outlet 32. The rise in temperature of the water passing through the heat absorber is measured by means of thermometers 34 and 36 which are mounted respectively in the thermometer wells 14 and 20.

The heat absorber 18 is formed by an upright outer cylinder 38 and a second cylinder 40 within the cylinder 38 and spaced apart by a ring 42 at the top and a ring 44 at the bottom. The rings 42 and 44 are secured to the cylinders so as to form a water-tight chamber. The cylinders shown in the drawings are circular in cross section, but cylinders having other cross sections may be used. The term cylinders is used in the claims to include any closed surface generated by a straight line moving parallel to itself. A heat insulating jacket 46 surrounds the water compartment 17 of the heat absorber, to form a dead air space around the compartment and thus prevent radiation. The insulating jacket 46 and the absorber 14 are supported by legs which are threaded into lugs 50 secured to the insulating jacket 46. A water inlet nipple 52 is secured to the upper end of the water compartment wall 38 and passes through the jacket 46. The outwardly projecting arm of the nipple 54 is connected to the lower end of the cylinder 38 and extends outwardly through the jacket 46. A coupling 56 is mounted on the outer end of the nipple 54 by which it may be connected with the thermometer well 20.

The water used to absorb the heat usually contains dissolved or entrained air or other gas. During the heating of the water in the water compartment of the heat absorber 18, the dissolved gases are set free and collect in the top of the water chamber. In order to remove the collected gas and keep the chamber full of liquid, a vent by which the gases may escape is provided at the top of the water compartment. The vent consists of a nipple 58 at the top of the outer wall 38 of the water compartment and extending through the insulating jacket 46. To the outer end of the coupling 58 is connected an upright tube 60 by means of an elbow 62 and a coupling 64.

To insure that all of the products of combustion will be brought into close contact with the wall of the water chamber, a cylindrical tube 66 is supported by means of spring friction strips 68 within the cylinder 40 to provide a narrow passage-way 70 for the products of combustion. Closed double conical bottoms 72 and 74 secured to the bottom of the tube 66 are supported above the top of the burner 28, a sufficient distance to permit the gas to be completely burned. The cones 72 and 74 deflect the combustion products into the passage-way 70 and act to produce eddy currents for agitating the gas while it passes through the passage-way. This agitation assists the transfer of heat from the gases to the water in the compartment 17. The baffle 66 is preferably made of mica or some other material which has a low heat capacity. In order to strengthen the baffle 66 and to prevent convection in the air within the baffle, circular plates 76 are mounted horizontally in the baffle 66. In order to throw the flame of the burner 28 outwardly toward the walls of the water compartment, a cross-shaped spreader 78 is placed on the top of the burner 28 to form openings 80 through which the fuel gas is directed outwardly toward the walls of the container.

By causing the products of combustion to pass in a thin layer on one side of the cylinder 40 and causing the liquid to pass in a thin layer on the other side of the cylinder 40, the quantities of gas and liquid passing through the heat interchanger 18 at any one time are kept as small as possible, and due to the large contact surface, the passage of heat from the gas to the liquid is almost instantaneous. The length of the cylinders forming the heat interchanger 18 will be made such that the products of combustion are deprived of all the heat gained by combustion of the fuels having the highest calorific value and highest flame temperature and leave the heat interchanger 18 at the same temperature at which they entered.

The flow of air through the heat interchanger is controlled by means of a rotatable cap 82 mounted on the top of and surrounding the outlet 32 for the products of combustion. The cap 82 is provided with a series of openings 84 which are arranged to register with similar openings 86 in the top of the outlet 32. By rotating the cap 82 the openings 84 and 86 may be brought into a more or less complete alinement to vary the size of the exhaust openings and thereby control the velocity of flow of the products of combustion through the passage-way 70. To insure a steady and well regulated supply of air to the combustion chamber above the burner 28, a series of horizontal plates 88 are mounted on the burner 28 and are provided with perforations 90. The perforations 90 of the different plates are out of alinement to prevent the air for combustion from traveling in a straight path through the combustion chamber.

The temperature of the products of combustion is determined by a thermometer 92, supported in the outlet 32 by the cap 82. The products of combustion leaving the heat interchanger 18 should be at room temperature to insure that all of the heat formed by combustion of the fuel gas is absorbed in the cooling liquid. In some cases however the heat absorbing liquid is so much cooler than the atmosphere that the products of combustion are cooled below atmospheric temperature. To correct this excessive cooling a sliding sleeve or collar 94 is supported in the outlet 32 by a rod 96 which is held in place by a set screw 98 threaded into the cap 82. In operating the apparatus it is preferable to exhaust the gas in practically a direct path. To accomplish this the sleeve 94 is drawn into the outlet 32. If, however, the products of combustion are cooled to a temperature below that of the atmosphere, the sleeve 94 will be lowered so as to cause the products of combustion to pass down inside the upper part of the baffle 66 and be reheated by the heated gas on the outside of the baffle until the proper temperature is obtained.

In the combustion of gas containing hydrogen or hydrogen compounds, water vapor is formed which condenses on the inner surface of the cylinder 40 and gives up its heat of condensation to the water in the water compartment. The temperature rise of the water passing through the heat interchanger therefore does not indicate the true heat of the combustion of the gas, but the heat of combustion plus the heat of condensation of the water formed by combustion. To obtain a true measurement of the heat of combustion, an amount of heat equivalent to that given up by the condensing vapor must be subtracted from the results obtained from the thermometer readings. The amount to be subtracted can be determined by collecting and measuring the condensed vapor and calculating the heat of condensation. In order to collect the condensed vapor a cap 100 is mounted onto the lower end of the heat insulating jacket or mantel 46. The opening 31 for the entrance of air for combustion is formed in the cap 100 by a flange formed around an opening in the center of the cap 100 to form a channel 102 in which to collect the water of condensation. The moisture formed in the combustion of the gas condenses on the inner surface of the cylinder 40, runs down the cylinder and collects in the channel 102. The water collected in the channel 102 flows out through an outlet 104 into a graduate 106 by which it may be measured.

The gas tank 24 consists of a glass container or bottle having a mouth 108 in its upper end and provided with a stopper 110 through which connections 112 and 114 for the tubes 22 and 26 enter the tank. A tube 116 is provided for the admission of gas.

In order to reduce the gas supplied to the calorimeter to standard conditions the pressure and temperature of the gas in the gas tank 24 must be determined. A manometer 118 for determining the pressure in the tank is supported on the heat absorber 18 and is in communication with the gas tank 24 through a flexible tube 120 and a glass connector 122 mounted in the stopper 110. The temperature of the gas in the tank 24 may be determined by means of a thermometer 126 supported by the stopper 110.

The amount of gas burned in the heat absorber 18 during a test is usually very small and the amount of water collected in the graduate 106 from the gas burned during a test will sometimes be too small to be accurately determined. In this case the quantity of gas burned during the test may be determined. By burning a larger measured amount of gas in the heat absorber 18, the amount of moisture collected in the graduate 106 during this second burning may be accurately determined and the amount of the moisture condensed during the time of the test may be then calculated. For determining the quantity of gas supplied to the heat absorber 18 during a test, the gas tank 24 is provided with a number of graduations 128 to indicate the volume of gas withdrawn from the tank.

A tube 130 extends from the bottom of the gas tank to the bottom of the glass connector 112 of the tube 22 so as to conduct the water entering the tank 34 from the tube 22 to the bottom of the tank without forming a syphon. An opening 132 is provided in the lower part of the gas tank 24, through which a tube 134 connects for the outflow of water. Pinch-cocks 136 are provided on the tubes 22, 26, 116 and 134 for regulating or stopping the flow of gases and water.

The specific details of the calorimeter may be varied without departing from the above invention which is directed primarily toward the means for obtaining an instantaneous exchange of heat between the products of combustion of the gas being tested and the water serving as an absorption medium.

Having described the preferred form of the invention, what is claimed as new is:

1. A gas calorimeter comprising a gas tank, a straight annular container having cylindrical walls spaced a short distance apart, said container being open at the bottom for the direct admission of air thereto, an outlet mounted on the top of said container forming a direct passage of combustion gas from said container to atmosphere, a burner inclosed by the inner wall of the container, means for connecting said burner with said gas tank, a water inlet for said annular container, a conduit for leading water from said container to said tank and means for measuring the rise in temperature of the water passing through said container.

2. A gas calorimeter comprising a gas tank, an annular water chamber having cylindrical walls spaced a short distance apart, a burner inclosed by the inner wall of said water chamber, means for connecting said burner with said gas tank, a water inlet for said annular water chamber, a conduit for leading water from said water chamber to said tank and a gas deflector within and spaced a short distance from the inner wall of the water chamber.

3. A gas calorimeter comprising a gas tank, an annular water chamber having cylindrical walls spaced a short distance apart, a burner inclosed by the inner wall of said water chamber, means for connecting said burner with said gas tank, a water inlet for said annular water chamber, a conduit for leading water from said chamber to said tank, means for measuring the rise in temperature of the water passing through said chamber, a cylindrical gas deflector within and spaced a short distance from the inner wall of the container and open at its upper end, and a vertically adjustable cylindrical gas outlet at the top of the inner wall of the condenser and projecting into said gas deflector.

4. In a gas calorimeter, a water heating chamber comprising a vertical cylinder, a second cylinder within and spaced a short distance from said first mentioned cylinder, rings closing the ends of the space between the cylinders, a water inlet at the top and a water outlet at the bottom of said condenser and a cylindrical gas deflector within and spaced a short distance from said inner cylinder.

5. In a gas calorimeter, a water heating chamber comprising a vertical cylinder, a second cylinder within and spaced a short distance from said first mentioned cylinder, rings closing the ends of the space between the cylinders, a water inlet at the top and a water outlet at the bottom of said chamber and a cylindrical gas deflector having a lower inverted conical end within and spaced from the walls of said inner cylinder.

6. In a gas calorimeter, a water heating chamber comprising a vertical cylinder, a second cylinder within and spaced a short distance from said first mentioned cylinder, rings closing the ends of the space between the cylinders, a water inlet at the top and a water outlet at the bottom of said chamber, a cylindrical gas deflector extending within and spaced a short distance from said inner cylinder and a gas burner below said deflector.

7. In a gas calorimeter, a water heating chamber comprising a vertical cylinder, a second cylinder within and spaced a short distance from said first mentioned cylinder, rings closing the ends of the space between the cylinders, a water inlet at the top and a water outlet at the bottom of said condenser and a cylindrical gas deflector within and spaced a short distance from said inner cylinder, a gas burner below said deflector, and means for measuring the rise in temperature of the water passing through said cylinders.

8. In a gas calorimeter, a water heating chamber comprising a vertical cylinder, a second cylinder within and spaced a short distance from said first mentioned cylinder, rings closing the ends of the space between the cylinders, a water inlet at the top and a water outlet at the bottom of said condenser, a cylindrical gas deflector within and spaced a short distance from said inner cylinder, means for measuring the rise in temperature of the water passing through the heating chamber and means for feeding gas to said burner in a constant ratio to the rate of passage of the water.

9. In a gas calorimeter, a water heating chamber comprising a vertical cylinder, a second cylinder within and spaced a short distance from said first mentioned cylinder, rings closing the ends of the space between the cylinders, a water inlet at the top and a water outlet at the bottom of said condenser, a cylindrical gas deflector extending within and spaced a short distance from said inner cylinder, means for feeding gas to said burner in a constant ratio to the rate of passage of the water, and means for controlling the exit of the products of combustion from said inner cylinder.

10. In a gas calorimeter, a water heating chamber comprising a vertical cylinder, a second cylinder within and spaced a short distance from said first mentioned cylinder, rings closing the ends of the space between the cylinders, a water inlet at the top and a water outlet at the bottom of said container, a cylindrical gas deflector extending within and spaced a short distance from said inner cylinder, means for feeding gas to said burner in a constant ratio to the rate of passage of the water, means for controlling the exit of the products of combustion from said inner cylinder, and means for removing air from the top of the annular chamber.

11. A gas calorimeter comprising means for passing liquid in one direction only in a thin substantially uniformly flowing layer, means for burning gas at a rate proportionately to the flow of the liquid in said layer, means for passing the products of combustion in one direction only as a thin layer in a heat conducting relation to said layer of water and means for measuring the rise in temperature of the liquid due to the absorption of heat from the gases of combustion.

In testimony whereof I affix my signature.

WILBUR G. LAIRD.